Aug. 13, 1935.   N. MASAMITSU   2,011,062
GARDENING IMPLEMENT
Filed July 18, 1934
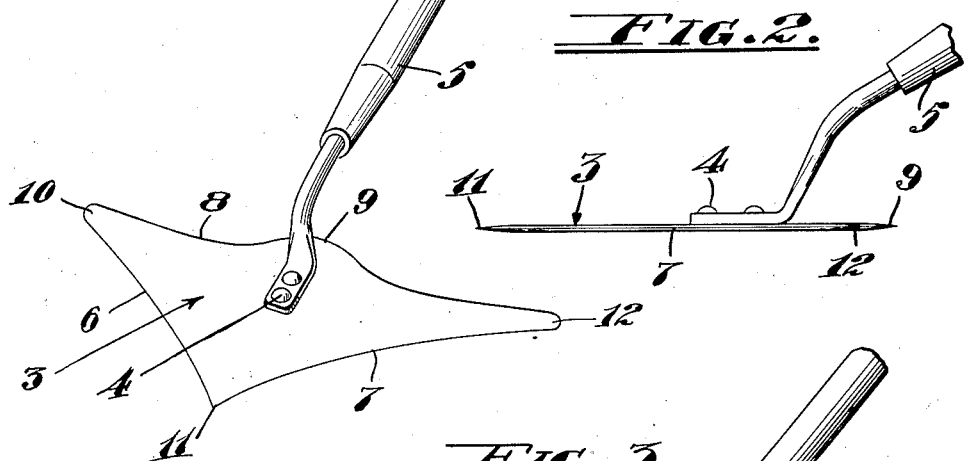
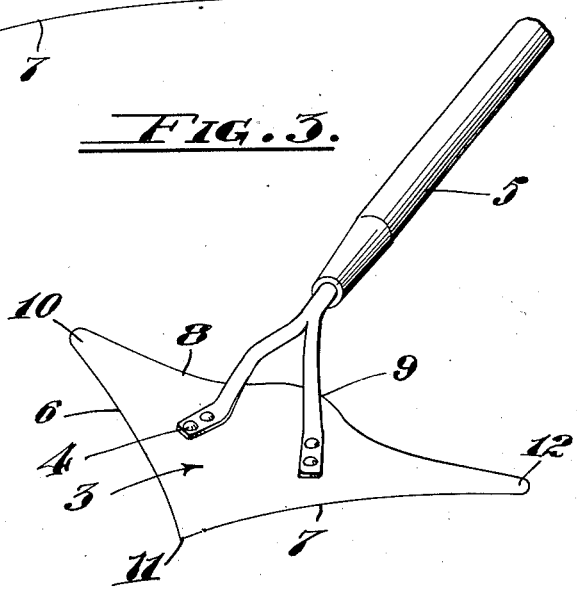
Inventor.
Noriyoshi Masamitsu
By
Edward M. Kojima
Att'y.

Patented Aug. 13, 1935

2,011,062

UNITED STATES PATENT OFFICE 2,011,062

GARDENING IMPLEMENT

Noriyoshi Masamitsu, Los Angeles, Calif.

Application July 18, 1934, Serial No. 735,795

1 Claim. (Cl. 97—68)

This invention relates to garden tools of the hoe type.

An object of the invention is to provide a multi-bladed hoe which is sharpened throughout its periphery and may be used in various positions for effective weeding and cultivating.

Another object is to provide a hoe having a substantially triangular blade with a continuous cutting edge arranged so that any one of the several edges may be used as desired whereby to eliminate frequent sharpening of the blade and to adapt the hoe to various kinds of work.

A further object is to provide a hoe blade of the character described which has a protruding portion.

Yet another object is to provide a hoe such as described wherein by providing a multiplicity of cutting edges there are also provided a plurality of digging points of different lengths and widths, and which are useful in digging holes for planting purposes and for cultivation work.

The invention has other objects and features, some of which, with the foregoing will be set forth in the following description of the preferred form of the invention illustrated in the accompanying drawing. It is understood however, that changes as to minor details and arrangements of the form of the invention here illustrated and described may be made within the scope of the claim hereto appended.

Fig. 1 is a perspective view of a hoe constructed in accordance with said invention.

Fig. 2 is a side elevation of said hoe.

Fig. 3 is a perspective view of a hoe showing a modified form of handle.

Referring to the embodiment of the invention shown in the accompanying drawing it is seen that the tool is comprised of a substantially flat plate like blade 3 of a generally triangular outline. Attached to the blade as at 4 is a handle 5 whereby to provide the hoe characteristics of the tool.

The shape of the blade is such that the two edges 6 and 7 are concaved and of like curvature and length whereas the other and longer edge 8 although curved inward is formed at a point centrally of its ends with a rounded outwardly projecting edge portion 9. It should be noted that the entire periphery of the blade is sharpened whereby to produce a continuous cutting edge.

It is apparent that the blade is provided with pointed ends 10, 11 and 12 and that the portion 9 constitutes a "point". With this arrangement, a sharp edge is always available and frequent sharpening of the blade is unnecessary. Furthermore these points and edges are so disposed as to permit of effective weeding and hoeing operations of all kinds.

It should be noted that the points 10 and 12 are longer and narrower than the point 11 whereby the point best suited to the particular work may be used as desired.

I claim:

In a hoe, a blade of substantially triangular outline having its entire periphery sharpened and defining a plurality of cutting edges and digging points and a handle attached to said blade, said blade being curved inwardly between said points, and a rounded projection extending rearwardly of the blade and defining a convexly curved cutting edge.

NORIYOSHI MASAMITSU.